Sept. 29, 1964     F. GEORGES     3,150,750
DEVICE FOR AUTOMATICALLY DISENGAGING A HANDWHEEL
MOUNTED ON A SHAFT WHICH IS ADAPTED TO BE
DRIVEN BY MEANS OF A SERVO-MOTOR
Filed Aug. 12, 1960     2 Sheets-Sheet 1
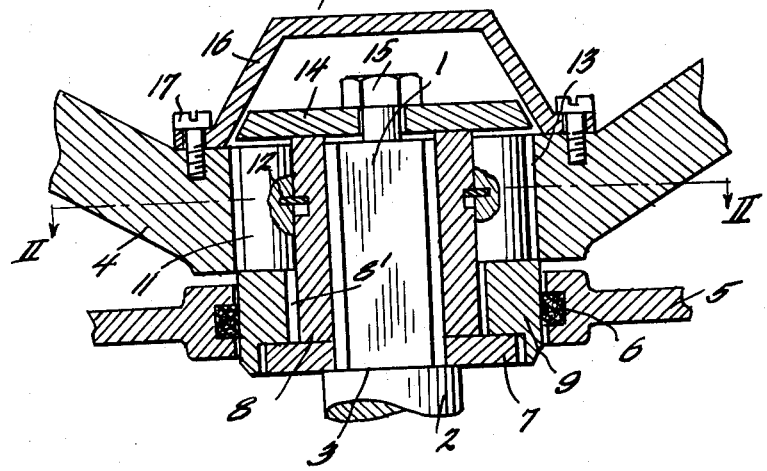
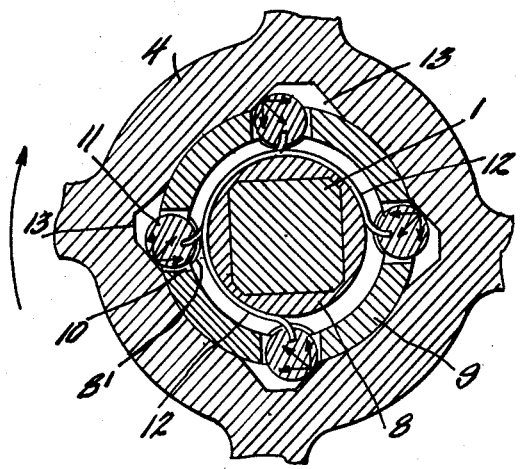
INVENTOR
Felix Georges
BY Watson, Cole, Grindle & Watson
ATTORNEYS

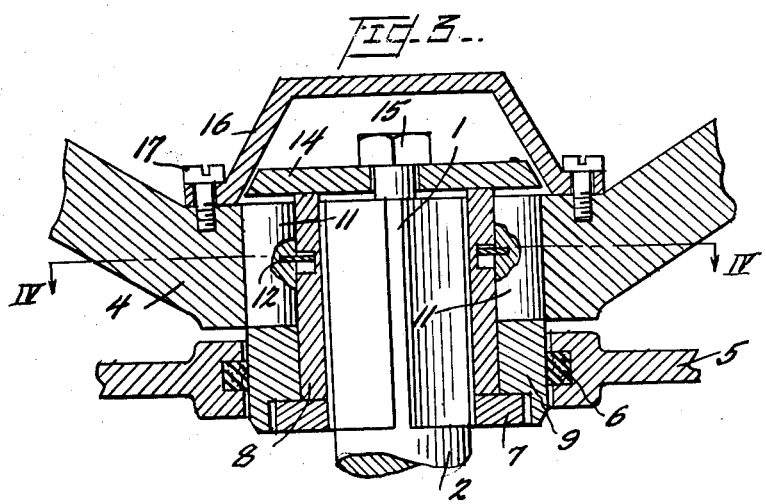
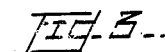
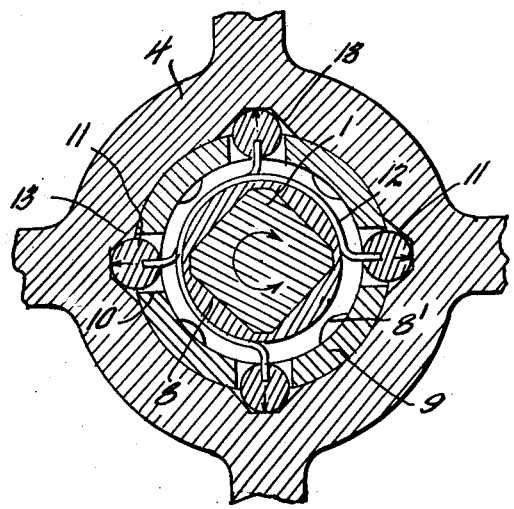

United States Patent Office 3,150,750
Patented Sept. 29, 1964

3,150,750
DEVICE FOR AUTOMATICALLY DISENGAGING A HANDWHEEL MOUNTED ON A SHAFT WHICH IS ADAPTED TO BE DRIVEN BY MEANS OF A SERVO-MOTOR
Felix Georges, Uccle, Brussels, Belgium, assignor to Société Auxiliaire d'Industrie "Sadi," S.P.R.L., Forest-les-Brussels, Belgium
Filed Aug. 12, 1960, Ser. No. 49,335
Claims priority, application Belgium Oct. 27, 1959
6 Claims. (Cl. 192—38)

The present invention relates to the devices for the remote control of equipment actuated by means of a servo-motor as well as by means of a manually operated handwheel.

The devices known hitherto suffer from the disadvantage, that when the remote control device begins to operate, the handwheel designed to provide manual control is also caused to rotate, which may endanger any personnel who may pass close by.

The purpose of the present invention is to eliminate this disadvantage and to provide a device allowing said actuation to be performed by means of a servo-motor as well as by means of manual control, said device automatically disengaging the handwheel when said actuation is performed by means of a servo-motor, and this in either direction of rotation.

To this end, the device for automatically disengaging a handwheel mounted on a shaft which is remotely controlled by means for a servo-motor, is essentially characterised by the fact, that it comprises rollers housed within a shell located at the extremity of the shaft of the servo-motor and within the hub of the handwheel, said rollers being attached to springs which tend to draw them away from a sleeve surrounding the extremity of the shaft, the shell being mounted in a stationary part with the interposition of a braking joint.

The handwheel conformable to the present invention is within its hub provided with recesses having sloping flanks and designed to receive the rollers which may be thrust away by means of centrifugal force and by the action of the springs.

A form of embodiment, given by way of example but in no manner by way of limitation, of a device providing automatic disengagement according to the invention, is shown in the accompanying drawings.

FIGURE 1 illustrates a section taken along the axis of the shaft of a servo-motor controlling an apparatus, the system being shown in the condition in which the apparatus is actuated by means of the handwheel.

FIGURE 2 illustrates a section taken along the plane II—II in FIGURE 1, the system being in the same condition.

FIGURE 3 illustrates a section similar to that shown in FIGURE 1, the components being shown in the condition in which the apparatus is actuated by means of the servo-motor.

FIGURE 4 illustrates a section taken along the plane IV—IV in FIGURE 3.

In these figures, 1 marks the squared end of the shaft 2 of a servo-motor, said shaft exhibiting its customary shoulder 3.

This shaft end moreover carries a handwheel 4 intended to operate the actuating shaft.

In order to be able to actuate said shaft in one direction or the other, either by means of the handwheel 4 or of the servo-motor, without turning the handwheel in the latter case, the two components in question are mounted on the same shaft in the manner hereinafter described.

A rubber joint 6 is fitted in the fixed part 5, and a washer 7 is fitted on the shoulder 3 of the end of the shaft. A sleeve 8 surrounding the shaft end 1 and exhibiting semi-cylindrical grooves 8' is fitted above said washer 7.

A shell 9 whereof the base is gripped by the rubber joint 6 and whereof the upper portion exhibits housings 10 accommodating the rollers 11, is positioned around said sleeve 8 and is also carried on the washer 7. The rollers are mounted on springs 12 which as a rule tend to thrust them outwards towards recesses 13 provided in the hub of the handwheel 4.

Said recesses 13 exhibit inclined flanks which when the handwheel 4 is operated, exert a force on the rollers whereof the centripetal component traps said rollers in the housings 10 of the shell 9 and thrusts them towards the sleeve 8 and the grooves 8' exhibited by the latter.

All these parts mounted within the hub of the handwheel 4 and around the squared end 1 of the extremity of the shaft of the servo-motor, are carried and located by means of a washer 14 secured by means of a screwbolt 15, the whole being protected by means of a sealing cap 16 secured by means of screws 17.

The device hereinbefore described operates in the following manner.

When the apparatus in question is actuated manually by means of the disengageable handwheel 4 in one direction of rotation or the other (FIGURES 1 and 2), the shaft 2 of the servo-motor being stationary, the rollers 11 tend to carry the shell 9 along. This shell 9 is however braked by means of the rubber joint 6. As a result and owing to the presence of the recesses 13, an action is exerted on the rollers 11, the centripetal component referred to tending to trap said rollers in the grooves 8' of the sleeve 8. The handwheel 4 is thus coupled to the shaft 2 of the servo-motor by means of the rollers 11 and the sleeve 8, thereby rendering it possible to turn the shaft 2 in one direction or the other by means of the handwheel 4. The distance between the bottom of a groove 8' and the inner cylindrical surface of the handwheel should be smaller than the diameter of the rollers 11. Unless this is so, the handwheel 4 would rotate without hindrance about the shell 9, thus failing to act on the shaft 2 through the sleeve 8.

When the apparatus in question is operated by means of the servo-motor (FIGURES 3 and 4), the shaft 2 and the sleeve 8 by rotating and owing to the presence of the semi-cylindrical grooves 8', exert a centrifugal force on the rollers 11 which with the assistance of the springs 12 pushes said rollers into the recesses 13 machined in the hub of the handwheel 4. The shaft 2 and the sleeve 8 may thus rotate freely without taking the handwheel along, the latter moreover being braked by means of the rubber joint 6.

I claim:
1. In an automatically actuated clutch device an annular drive member, a driven shaft which itself may be otherwise driven, extending axially within said annular drive member, a stationary part, a sleeve surrounding and fixed with relation to an end of said shaft, a rotary tubular shell having at least one opening therein and having a portion thereof fitted within said stationary part, and a frictional braking joint between the surfaces of said shell and of said stationary part; said shell surrounding and concentric with said sleeve and disposed within said annular drive member, a roller disposed within each of said openings through said shell and exposed respectively to the inner wall of said annular member and the outer wall of said sleeve, means for securing each of said rollers such that said rollers revolve with said annular member, and springs contacting each of said rollers and urging them radially outwardly away from driving contact with said sleeve.

2. The clutch device as set forth in claim 1 in which said means for securing each of said rollers comprises a recess having inclined side walls in the internal surface of said annular drive member, each of said recesses respectively receiving each of said rollers to a greater or less degree depending on the outward thrust by the action of the centrifugal force of said shaft and the urging of said springs.

3. The clutch device as set forth in claim 2 in which said springs are generally arcuate in configuration, surround said sleeve, and engage each of said rollers in such manner as to urge them radially outwardly.

4. The clutch device as set forth in claim 2 in which said sleeve is provided upon its outward periphery with at least one axially extending groove of segmental cylindrical configuration, in which each of said rollers engage said sleeve by the radial inward urging of the inclined side walls of the recesses in said annular member, as when said last named member constitutes the driving means for said shaft.

5. The clutch device as set forth in claim 2 in which the radial distance between the bottom of each groove in the sleeve and the inner cylindrical surface of said annular member is less than the diameter of each of the rollers, whereby when said annular member is rotated each roller is constrained to revolve with it.

6. The clutch device as set forth in claim 2 in which said springs are generally arcuate in configuration, surround said sleeve, and engage each of said rollers in such manner as to urge them radially outwardly, in which said sleeve is provided upon its outward periphery with at least one axially extending groove of segmental cylindrical configuration, in which each of said rollers engage by the radial inward urging of the inclined side walls of the recesses in said annular member, as when said last named member constitutes the driving means for said shaft, and in which the radial distance between the bottom of each groove in the sleeve and the inner cylindrical surface of said annular member is less than the diameter of each roller, whereby when said annular member is rotated each roller is constrained to revolve with it.

References Cited in the file of this patent

UNITED STATES PATENTS

| | | |
|---|---|---|
| 1,008,428 | Moseson | Nov. 14, 1911 |
| 1,990,153 | Woolson | Feb. 5, 1935 |
| 2,420,552 | Morrill | May 13, 1947 |
| 2,796,317 | Valenti et al. | June 18, 1957 |
| 2,811,232 | Seidel | Oct. 29, 1957 |

FOREIGN PATENTS

| | | |
|---|---|---|
| 437,891 | Great Britain | Nov. 7, 1935 |
| 1,015,274 | France | July 2, 1952 |
| 1,052,180 | Germany | Mar. 5, 1959 |